Aug. 26, 1969          H. W. GERARDE          3,463,322
                    PRESSURE FILTRATION DEVICE
Filed July 28, 1967                          2 Sheets-Sheet 1

INVENTOR
HORACE W. GERARDE
BY
Kane, Dalsimer, Kane, Sullivan + Smith
ATTORNEYS

Aug. 26, 1969 H. W. GERARDE 3,463,322
PRESSURE FILTRATION DEVICE
Filed July 28, 1967 2 Sheets-Sheet 2
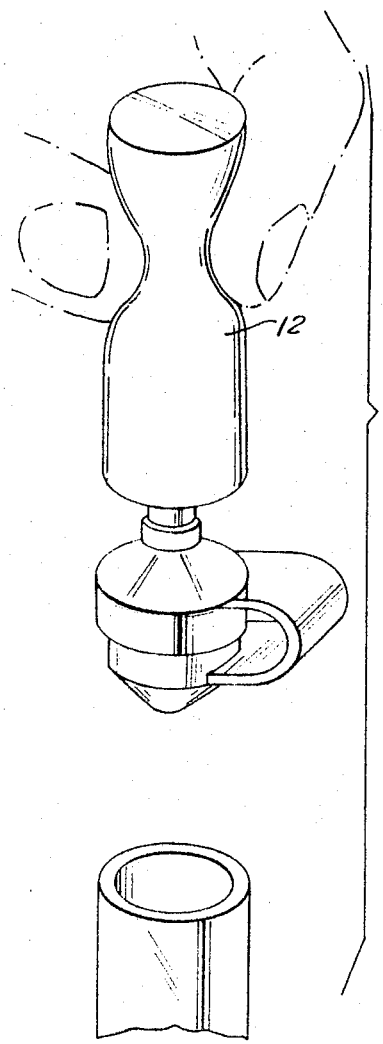
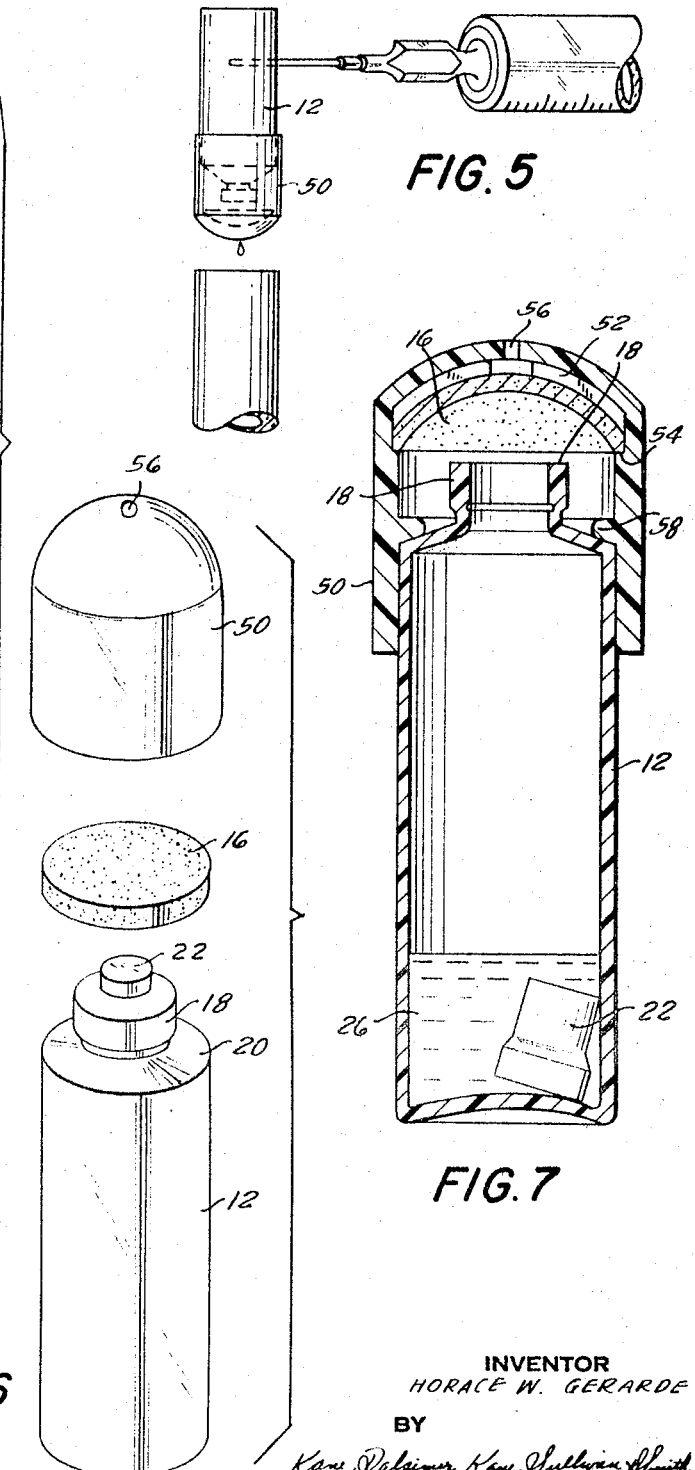
FIG. 4
FIG. 5
FIG. 6
FIG. 7
INVENTOR
HORACE W. GERARDE
BY
Kane, Dalsimer, Kane, Sullivan Smith
ATTORNEYS

United States Patent Office 3,463,322
Patented Aug. 26, 1969

3,463,322
PRESSURE FILTRATION DEVICE
Horace W. Gerarde, 40 Knoll Road,
Tenafly, N.J. 07670
Continuation-in-part of application Ser. No. 426,527,
Jan. 19, 1965. This application July 28, 1967, Ser.
No. 656,783
Int. Cl. B01d 29/42, 29/00
U.S. Cl. 210—455                3 Claims

ABSTRACT OF THE DISCLOSURE

A pressure filtering device to quantitatively separate liquid filtrate from insoluble or particulate components of a liquid suspension. A pressurizable container having an outlet together with a cap received in direct communication at the container outlet to form a closed system and including a dispensing opening together with a filter member carried within the cap in the liquid flow passage whereby the liquid suspension, upon pressurization of the container, may be expressed therefrom for filtering and collection of both filtrate and precipitate.

Cross-reference to related applications

This application relates to and is a continuation-in-part of United States application Ser. No. 426,527, filed on Jan. 19, 1965 and now abandoned.

Background of the invention

During the course of development in the field of microbiochemical experimentation, a need has arisen for a device capable of rapid quantitative filtration to either supplement or supplant the use of a clinical centrifuge and other forms of filtration devices now in use. A centrifuge has been used and is now being used for such experimentation but, in many instances, its use is either impossible or impracticable. Research is now being conducted in remote areas of the world, areas where electricity is not readily available, and therefore, areas unsuited for the use of a centrifuge. Further, where the volume of work being carried out does not warrant the purchase of a centrifuge, the device of the invention is particularly adaptable.

Aside from the clinical centrifuge, other filtering devices new in use have been found to be similarly unsuited for use in microbiochemical experimentation since such devices have been found to provide a very slow nonquantitative filtration due to the inherent characteristics of the operating parts.

Summary of the invention

The present invention, therefore, seeks to provide an improved filtration device capable of performing a rapid quantitative filtration of a liquid suspension. Thus, the invention contemplates a pressurizable container having an outlet opening and including a liquid reagent therein. To this reagent the substance to be filtered and tested is added and reacted. A cap or housing fitted with a suitable filter element is mounted on the container so as to form a closed system. The assembly, to insure complete reaction of the substance and reagent, is shaken and thereafter the contents are pressure filtered. Upon pressurization, the liquid suspension within the container is rapidly forced toward the filter and through the same, separating into its constituent parts—a filtrate and a precipitate, or particulate fraction.

In accordance with the foregoing discussion it is a principal object of the invention to provide a portable disposable device capable of rapid quantitative filtration of small or micro quantities of components of a liquid mixture so as to separate the liquid phase from the insoluble or particulate components suspended therein.

An additional object of the invention is to provide the various operating parts of the filtration device with positioning means which function, upon assembly, to assure a proper relative positioning without the need of visual inspection.

It is a further object to provide a device which will supplant the use of clinical centrifuges used in conjunction with experimentation in micro-biochemical research.

An additional object is to provide a device which, through its inherent simplicity, is easy to use, is relatively inexpensive to manufacture, so that it may be discarded after use, and is small in size, therefore being portable and further readily adaptable for use in various microbiochemical fields, such a biological fluid analysis or water analysis.

Other objects and advantages of the invention will become apparent to those skilled in the art as the following description is developed.

In carrying out that invention, I provide a portable disposable device which comprises a relatively small pressurizable container member having an outlet opening. The container member has a suitable liquid reagent therein and to which is added a substance to be tested. The resultant mixture is one in which at least one component is in the liquid phase. A cap or housing member formed with a dispensing opening is removably applied to the container member so that the cap interior is in direct communication with and spaced relative to the outlet. A filter member is supported within the cap so as to be spaced from the container and both openings. The mixture in the container is completely reacted and the container is pressurized so that the mixture separates into its constituent parts at the filter.

Brief description of the drawings

In the drawings which both illustrate and form a part of the application,

FIGURE 6 is an exploded perspective view of a second embodiment of the invention, and FIGURE 7 is a view in vertical section showing the parts of FIG. 6 in the assembled condition.

Brief description of the preferred embodiments

Figure 1:
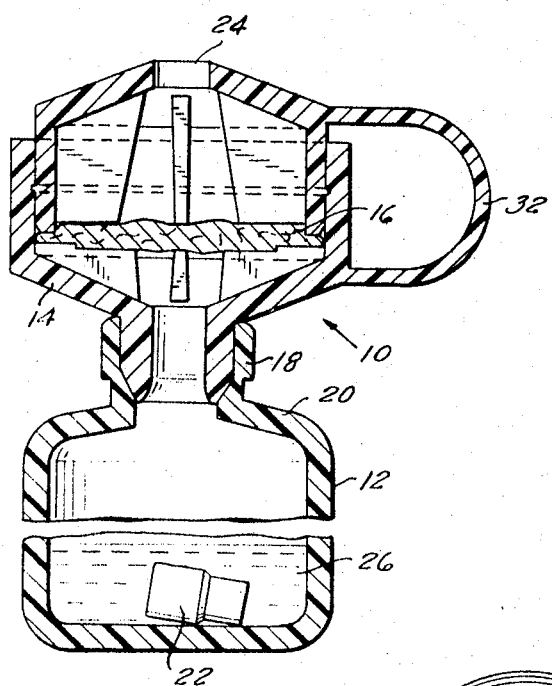
FIGURE 1 is an elevational view in vertical section of one form of the filtering cap or housing defining the invention.

Turning to the figures and particularly FIG. 1, a preferred embodiment of the rapid quantitative filtering device, drawn to an enlarged scale for the purpose of illustration, is denoted by the numeral 10. For the same purpose the scale of the remaining figures is also enlarged.

The filtering device includes a container 12, only partially shown in the figure, and a cap or housing 14 for supporting a filter element 16 within its confines.

The container, shown in the entirety of FIG. 7, is generally in the form of an elongated cylinder and may be formed of any suitable plastic material which is characterized as being flexible, resilient, pierceable and inert to the mixture to be later contained therein. Polyethylene polyterafluoroethylene, polychlorotrifluroethylene, polymers and co-polymers of vinyl chloride are representative of such materials. In the preferred embodiment polyethylene is used. In this regard a polyethylene container is capable of undergoing a compressive force, as hereinafter discussed, on its side walls to pressurize the interior, or else a single wall may be easily penetrated by a cannula, to likewise pressurize the interior and thereby force the contained liquid suspension from the container and toward the filter element 16 within the cap or housing 14. The container is also small in size and its walls are also preferably translucent. Thus, the device is readily adaptable to micro-biochemical procedures and the process may be observed. Further, if the cannula is of extended length, the operator will be appraised of the penetration of but only one wall.

The container is closed at one end. A neck portion 18 is longitudinally formed to extend from the other end. An outlet opening connecting the atmosphere to the interior of the container is provided within the neck. The external diameter of the neck, in the preferred embodiment, is less than the outside diameter of the container 12 so that the base of the neck and the end of the container define a shoulder 20.

The neck 18 is of a suitable length so that it presents an internal cylindrical wall wherein a plug 22 (FIG. 6) is frictionally received when the device is not in use, therefore, sealing the chamber from the atmosphere.

Plug 2 may likewise be formed of a material, such as polyethylene. To positively insure a sealing relationship in the event the container is stored with a liquid reagent therein, a suitable non-reacting material, such as a wax or the equivalent, may be provided around the plug and neck portion. Wax has been found to provide a secure seal for the plug and neck, yet the plug may be easily removed when desired. As discussed, the plug, in FIG. 6, is in a sealing relationship and in FIGS. 1 and 7 the plug has been forced within the container to function as a mixing bead.

A filter for use in the filtration process is indicated by the numeral 16. This filter may vary in diameter, thickness, porosity and density, such factors being determined by the properties of the particular precipitate to be filtered out of the mixture and the internal diameter of the cap or housing 14 within which the filter is placed. As an example water may be made sterile by the implementation of a filter having a porosity of 0.45 micron. Further, it would be apparent that in most instances, the filter 16 should be of a material that will not react with the mixture being filtered but it is also contemplated that the filter may be chemically treated so as to react with the mixture. I have found that filters composed of a paper cellulose fiber or fiber glass are, in general, suitable for use. Filters of this general type are sold under the trademark Millipore by the Millipore Corporation, Bedford, Mass.

A cap 14, which is also preferably made of the material selected for the container receives the filter element, as will be discussed, so that the filter will completely overlie a dispensing opening 24. By forming the cap of the material used for the container, as for example resilient polyethylene, the container will tightly receive the cap with the latter being substantially immovable during the pressurization of the chamber. In the preferred embodiment the cap or housing 14 is received within and supported by the neck 18 once the plug 22 is removed.

In the assembled condition the container, with mixture 26, may be pressurized so that (FIGS. 4 and 5) the mixture is directed to the filter and the filtrate collected at the dispensing opening 24 in the usual manner.

Figure 2:
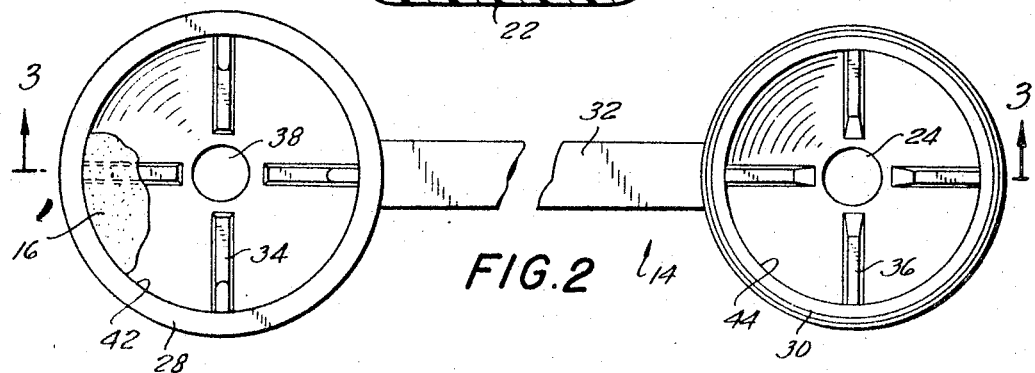
FIGURE 2 is a top plan view of the cap or housing member in the open condition and including a fragmentary portion of the filter element.
Figure 3:
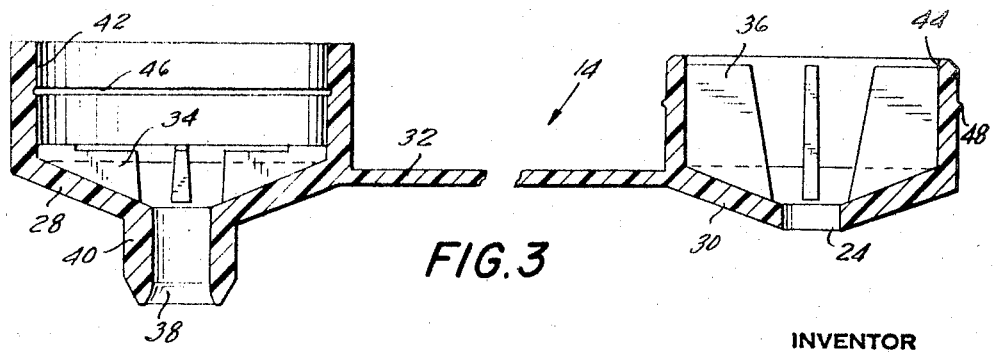
FIGURE 3 is a vertical section of the cap or housing as seen along the line 3—3 in FIG. 2, FIGURES 4 and 5 show the filtration device in an assembled condition and including various means by which the interior of a container may be pressurized.

Turning to FIGS. 2 and 3, the cap 14 is seen to be shown in more detail. Thus, the cap is formed of two open ended cup shaped members 28 and 30 that are integrally connected by a strap 32. Each of the members 28 and 30 are, respectively, provided with a plurality of ribs 34 and 36 that are generally located in quadrature and project upwardly from openings in the central portions of both cups. While four such ribs are shown in each cup member obviously a greater or lesser number would suffice. In this regard the function of the ribs 34 is to support the filter pad 16 (see FIG. 2) in close proximity to an opening 38 yet removed therefrom and to provide a maximum unobstructed area in the filter and maximum filter usage.

As seen in the figures the cup member 28, at the closed end, is formed with a neck 40 which has an external diameter substantially equal to the internal diameter of neck 18 of the container so that in mounting, FIG. 1, a tight frictional fit is obtained. Opening 38 is formed within the neck 40 so the the internal cap portion is in direct fluid communication.

As shown in FIG. 2 the ribs 34 are situated in a manner so as to radially project outwardly from the opening 38 toward the internal wall 42. Generally the ribs are spaced apart by angles of 90°.

Ribs 36 are similarly spaced in angular alignment so that when caps 28 and 30 are joined they cooperate to immovably support the filter element 16. In this regard the ribs, while radially projecting outwardly of dispensing opening 24 toward internal wall 44, are of greater height (see FIG. 3).

The cups are connectable for use. In this regard wall 42 is provided with an annular groove 46 and the complementary surface, or outer surface of cup member 30 is provided with an annular protuberance 48. Interlocking cooperation of the cup members will be maintained under pressure conditions that are developed yet the members may be separated from one another after a filtration operation so that the precipitate may be collected for desired analysis.

As apparent from FIG. 3 the closed end of cup member 30 slopes toward the dispensing opening. Thus, substantially the filtrate will drain toward the opening for connection, assuring quantitative results. For symmetry the closed end of cup member 28 may be likewise sloped.

Turning to a second form of the invention, FIGS. 6 and 7, there is shown a filtering device in the exploded as well as assembled condition. This form of the invention differs from that discussed in that it provides a cap 50 of slightly different construction.

In this regard, cap 50 is of one piece construction, formed of a material as cap 14 and in the form of an open ended cup receivable on the container 12 as shown. Receipt is by means of a friciton fit.

Cap 50 receives a filter pad 16 and in the present embodiment this filter is stationarily supported by and between a plurality of ribs 52 and an annular shoulder 54.

In a manner similar to the placement of ribs 34 or 36 of cap 14, ribs 52 maintain the filter in a position removed from dispensing opening 56. Preferably cap 50 is provided with four ribs in quadrature so that the major filter area is unobstructed. Also, the closed end of cap 50 is inclined toward the dispensing outlet to substantially eliminate any hold-up of filtrate for quantitative results.

As shown in the figures, the cap is mounted upon the container 12 exterior. Cap support is provided by an annular rib 58 which cooperates with the shoulder 20. This cooperation between rib and shoulder provides, with the necessary frictional engagement, for spatial relationship between the outlet end of container 12 and the filter element 16 so that the maximum surface area of the filter will be used during the process.

The container 12, as seen in each of FIGS. 1 and 7, is partially filled with an appropriate reagent, such as isopropyl alcohol, ethyl alcohol, nitric acid, stable tungstic acid, for reacting with a particular liquid substance which is added to the container so that upon completion of the filtration process, the desired separation will be effected. It should be apparent that the particular reagent is determined by the particular analysis which is being carried out. To collect a desired fraction, the precipitate, filtrate or other liquid solvent containing the desired component to be analyzed from the solution contained in the container is pressure filtered. To insure complete separation of the desired component, the process may be repeated by adding excess reagent. However, in the case of a precipitate and if the precipitate is desired, a suitable wash solution may be used in a manner as indicated above. The filter pad can be removed if desired for further tests to be carried out on the precipitate or particulate material collected on the precipitate.

Having the details of this invention in mind, reference is directed to FIGS. 4 and 5 which show the operation of the rapid quantitative filtration device. The figures show the preferred filtration device in conjunction with various means to pressurize the system to provide for the separation of a liquid suspension contained within the container into its constituent parts, as for example, a filtrate and a precipitate or particulate fraction. The means to apply pressure to the chamber within the container member, as shown, respectively, may be external pressure exerted directly on the walls of the container or internally of the container by means of a hypodermic syringe. It is also contemplated that the pressure may be provided by the implementation of a pressure bulb (not shown) which, like the syringe is provided with a cannula mounted thereon and capable of penetrating one wall of the container to raise the internal pressure. It should be apparent that the cannula should be of such diameter that it will easily penerate the container wall and still provide for the introduction of a presure sufficient to accomplish a rapid filtration of the mixture contained therein. The foregoing is presented for the purpose of example for other methods may be employed to provide desired results.

It is contemplated that the container may initially be with or without a reagent or liquid to be tested therein. When the container has a suitable reagent therein, the sealing plug is pushed into the chamber and a measured quantity of liquid to be tested is added by a conventional means. A cap unit having a selected filter therein and positioned as set forth above, is applied to the container so as to form with the chamber a closed system. The unit is vigorously shaken so that the liquid and the reagent completely react with one another to form a liquid suspension. The unit is inverted to readily filter and either by means of a compressive force on the container walls (FIG. 4) or by penetrating the container wall by the cannula of the syringe (FIG. 5) the chamber is pressurized and the mixture therein is forced toward and through the filter, to thereby separate into a filtrate and a precipitate or particulate fraction.

From the foregoing, it should be apparent that by the use of this device, rapid quantitative filtration is accomplished. The filtration, by experimentation, has been found to be quantitative for all practical purposes, since the amount of liquid holdup in the container, the filter disc and the cap is negligible.

The following are illustrative examples of the application of the device in micro-biochemical procedures.

(1) Blood-sugar determination (Folin-Wu filtrate)

The procedure for carrying out the blood-sugar determination is as follows: to a container having 2.0 ml. of stable dilute tungstic acid therein, 20 micro liters of whole blood is added by means of a pipette. The pipette carrying either plasma or whole blood is inserted into the container which has its sides initially compressed and the pipette is held in a stable position at the outlet opening of the container so that the end of the pipette is completely submerged in the acid. When the pipette is in position, the pressure is relieved from the container walls and the blood is thereby drawn into the acid beneath the surface. Thereafter, by recompressing the walls of the container, the pipette will be completely washed. The pipette is removed and a cap with a suitable filter supported therein is mounted on the container so as to cover the outlet opening. The contents of the container are then mixed for complete reaction of blood and acid. After a 3–4 minute period the container is inverted so that the outlet opening is down and the container is pressurized by means of a compressive force on the side walls so that the mixture is forced through the filter, and the filtrate collected in a conventional manner.

(2) Cholesterol determination

The procedure for determining the cholesterol content of blood is as follows: to a container having 2.0 ml. of 100% ethyl alcohol or isopropyl alcohol therein, 20 micro liters of either plasma or whole blood added by means of a pipette as described in Example 1. After the pipette is removed, a cap with a suitable filter supported therein is mounted on the container at the outlet opening. The reaction of plasma or whole blood and alcohol causes a proteinaceous precipitate to form and by shaking, this precipitate will be completely dispersed in the mixture and is then pressure filtered as described in Example 1. The filtrate which is collected is subsequently tested by the appropriate means.

The device and the technique of operation may also be employed with regard to a deproteinization of blood, plasma, serum, urine, spinal fluid or other biological fluids. It should further be apparent that the use of my invention is not limited to the above examples, but would also be applicable in areas such as the testing of fuels, water supplies, etc.

Having described the invention, I claim:

1. A device for use in micro-chemical testing of biological and similar fluids of the type which form a filtrate and a precipitate when mixed with a specific reagent and for rapidly and quantitatively separating by filtration said components of said mixture comprising a resilient, flexible container member of the type that can be internally pressurized as by compression having an outlet opening in communication with the container chamber adapted to hold a mixture in which at least one of the components is in the liquid phase and including a predetermined quantity of reagent, a filter element capable of passing as filtrate the liquid phase of said mixture and retaining as deposit for recovery the mixture precipitate, a cap member defined by a pair of hingedly connected cooperable cup elements that are frictionally interfitted forming a substantially closed unit and cooperable to be removably applied to said container, said cap having an internal chamber and a dispensing opening formed within one of said elements, the other element including a neck portion formed so as to be generally opposite said dispensing opening when said elements are interfitted, a plurality of raised ribs formed within said cap chamber surrounding said dispensing opening and means spaced from said ribs for removably supporting said filter in a stable operating position therebetween so that the filter is in both spaced and overlying relation to said dispensing and outlet openings, said filter being received within said cap and supported thereby to extend completely across the cap chamber, and said cap being frictionally and sealingly received within said container outlet opening in a manner to form a substantially sealed closed system and provide fluid communication between said container chamber and filter whereby at least partial inversion of the container and a pressurization of said chamber causes said mixture to be rapidly and quantitatively filtered with the filtrate collectable at said dispensing opening and the mixture precipitate collectable at said filter.

2. The testing device of claim 1 wherein said means spaced from said ribs comprise a second set of ribs surrounding said neck portion.

3. A testing device as defined in claim 1 comprising a predetermined quantity of reagent specific for the fluid being tested in said chamber and a closure plug at said container outlet for sealing and initially obstructing communication between the outer atmosphere and container chamber thereby to confine said reagent, said closure plug being displaceable into the container interior to provide a mixing bead therein.

References Cited

UNITED STATES PATENTS

| | | | |
|---|---|---|---|
| 2,389,185 | 11/1945 | Dick | 222—189 X |
| 2,761,833 | 9/1956 | Ward | 222—189 X |
| 3,149,758 | 9/1964 | Bush et al. | 222—189 |
| 3,184,118 | 5/1965 | Webster | 222—189 X |
| 3,189,223 | 6/1965 | Mackal | 222—189 X |

JAMES L. DECESARE, Primary Examiner

U.S. Cl. X.R.

210—474; 222—189